United States Patent
Kanazawa et al.

(10) Patent No.: US 11,741,113 B2
(45) Date of Patent: Aug. 29, 2023

(54) MEASUREMENT GUIDE DEVICE AND SIMULATION COMPUTING DEVICE USED THEREFOR

(71) Applicant: Hitachi, Ltd., Tokyo (JP)

(72) Inventors: Takuya Kanazawa, Tokyo (JP); Akinori Asahara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 161 days.

(21) Appl. No.: 17/413,040

(22) PCT Filed: Jan. 23, 2020

(86) PCT No.: PCT/JP2020/002319
§ 371 (c)(1),
(2) Date: Jun. 11, 2021

(87) PCT Pub. No.: WO2020/166300
PCT Pub. Date: Aug. 20, 2020

(65) Prior Publication Data
US 2022/0027364 A1    Jan. 27, 2022

(30) Foreign Application Priority Data
Feb. 13, 2019   (JP) ................... 2019-023370

(51) Int. Cl.
*G06F 16/24* (2019.01)
*G06F 16/2458* (2019.01)
*G01N 23/20* (2018.01)
(52) U.S. Cl.
CPC ........ *G06F 16/2458* (2019.01); *G01N 23/20* (2013.01)

(58) Field of Classification Search
CPC .................................................. G06F 16/2458
See application file for complete search history.

(56) References Cited

U.S. PATENT DOCUMENTS

| 5,200,910 A | 4/1993 | Subbiah |
| 2012/0151428 A1 | 6/2012 | Tanaka et al. |

(Continued)

FOREIGN PATENT DOCUMENTS

| JP | 2005-258480 A | 9/2005 |
| JP | 2013-033346 A | 2/2013 |

(Continued)

OTHER PUBLICATIONS

International Search Report of PCT/JP2020/002319 dated Apr. 14, 2020.

*Primary Examiner* — Mohammad S Rostami
(74) *Attorney, Agent, or Firm* — MATTINGLY & MALUR, PC

(57) ABSTRACT

The measurement guide device is able to easily select the next measurement target on the basis of previously obtained measurement results. The measurement guide device includes a database, a similarity search section, and a next-point proposal section. The database stores a virtual measured signal and a measurement procedure that are obtained by simulation. The similarity search section extracts, from the database, virtual measured signals similar to measurement results obtained by a measurement device, and measurement procedures regarding the virtual measured signals. The next-point proposal section selects at least one measurement procedure from the measurement procedures obtained by the similarity search section, and determines the next measurement point.

5 Claims, 16 Drawing Sheets

(56) References Cited

U.S. PATENT DOCUMENTS

| | | | |
|---|---|---|---|
| 2017/0038315 A1* | 2/2017 | Sasaki | G01N 23/20 |
| 2017/0160082 A1* | 6/2017 | Shinoda | G03F 7/70625 |
| 2017/0181645 A1* | 6/2017 | Mahalingam | A61B 5/74 |
| 2017/0311194 A1* | 10/2017 | Martin | H04W 24/10 |
| 2018/0268015 A1* | 9/2018 | Sugaberry | G06N 3/049 |
| 2018/0308030 A1* | 10/2018 | Nemati | G06Q 10/06314 |
| 2020/0029802 A1* | 1/2020 | Lane | G16H 50/20 |

FOREIGN PATENT DOCUMENTS

| | | |
|---|---|---|
| JP | 2017-032521 A | 2/2017 |
| WO | 2003/071480 A1 | 8/2003 |
| WO | 2011/021346 A1 | 2/2011 |
| WO | 2015/198926 A1 | 12/2015 |

* cited by examiner

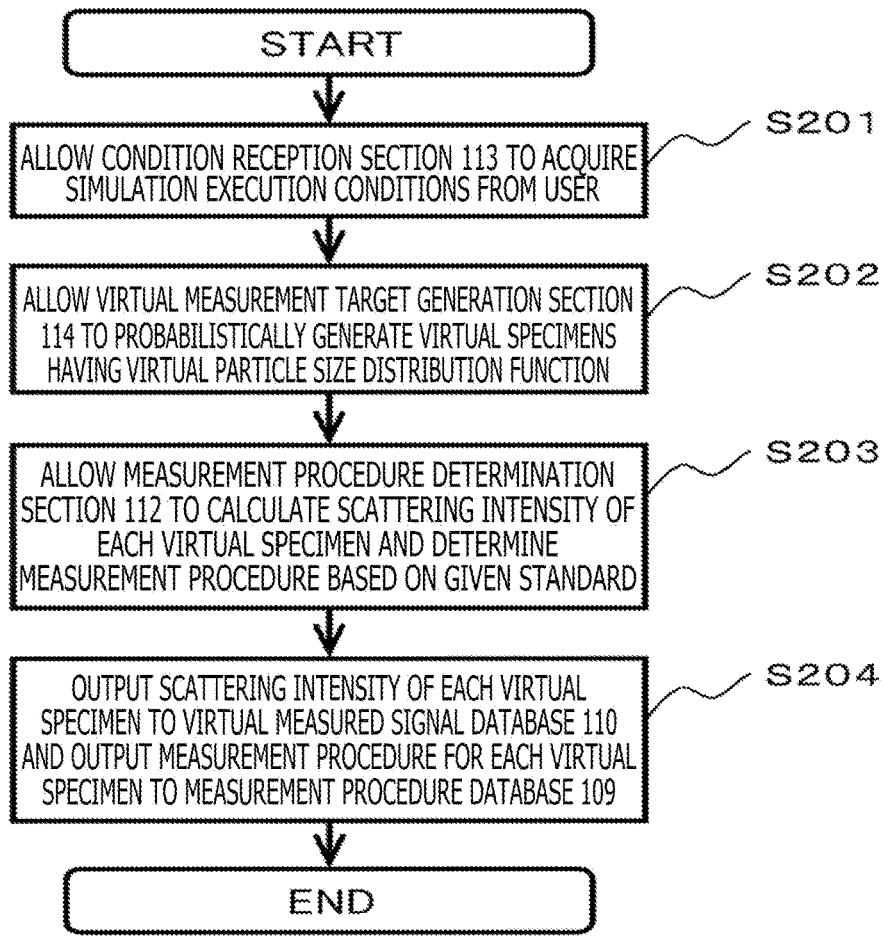

| VIRTUAL MEASUREMENT TARGET ID (501) | WAVENUMBER [nm⁻¹] (502) | SCATTERING INTENSITY (503) |
|---|---|---|
| 1 | 0.215 | $1.73 \times 10^2$ |
| ⋮ | ⋮ | ⋮ |
| 1 | 1.231 | $7.13 \times 10^2$ |
| 2 | 0.588 | $2.11 \times 10^2$ |
| ⋮ | ⋮ | ⋮ |
| 2 | 1.058 | $5.73 \times 10^2$ |
| 3 | 0.879 | $4.20 \times 10^2$ |
| ⋮ | ⋮ | ⋮ |

FIG. 6

| VIRTUAL MEASUREMENT TARGET ID (601) | WAVENUMBERS LISTED IN ORDER OF SCATTERING INTENSITY MEASUREMENT [nm$^{-1}$] (602) |
|---|---|
| 1 | 0.417, 0.848, 1.832, 1.281, 0.800, 1.669, ••• |
| 2 | 0.636, 0.265, 1.083, 1.597, 0.154, 1.397, ••• |
| 3 | 0.371, 0.984, 1.340, 1.464, 0.037, 1.496, ••• |
| 4 | 0.127, 1.611, 0.876, 1.035, 1.834, 0.726, ••• |
| ⋮ | ⋮ |

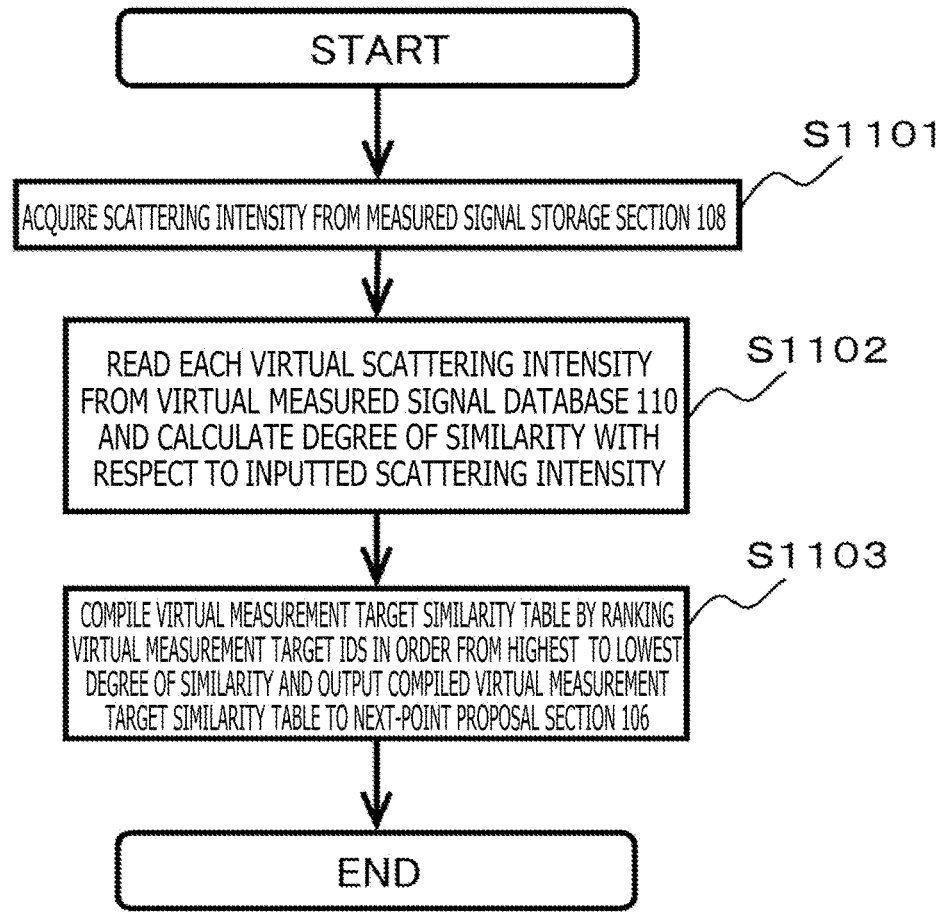

| DEGREE-OF-SIMILARITY RANKING | DEGREE OF SIMILARITY | VIRTUAL MEASUREMENT TARGET ID |
|---|---|---|
| 1 | 117.3 | 254 |
| 2 | 103.6 | 52 |
| 3 | 98.0 | 331 |
| 4 | 94.2 | 105 |
| ⋮ | ⋮ | ⋮ |

FIG.13

SELECT NEXT MEASUREMENT

WAVENUMBER [nm⁻¹]
- ○ 0.2305
- ● 0.1952
- ○ 0.1544
- ○ 0.0743

OUTPUT ABOVE-SELECTED VALUE TO MEASUREMENT DEVICE AND EXECUTE MEASUREMENT?

[YES]  [NO]

FIG.14

SELECT NEXT MEASUREMENT

WAVENUMBER [nm⁻¹]
- 0.2305
- 0.1952
- 0.1544
- 0.0743

OUTPUT ALL ABOVE VALUES TO MEASUREMENT DEVICE AND EXECUTE MEASUREMENT?

[YES]  [NO]

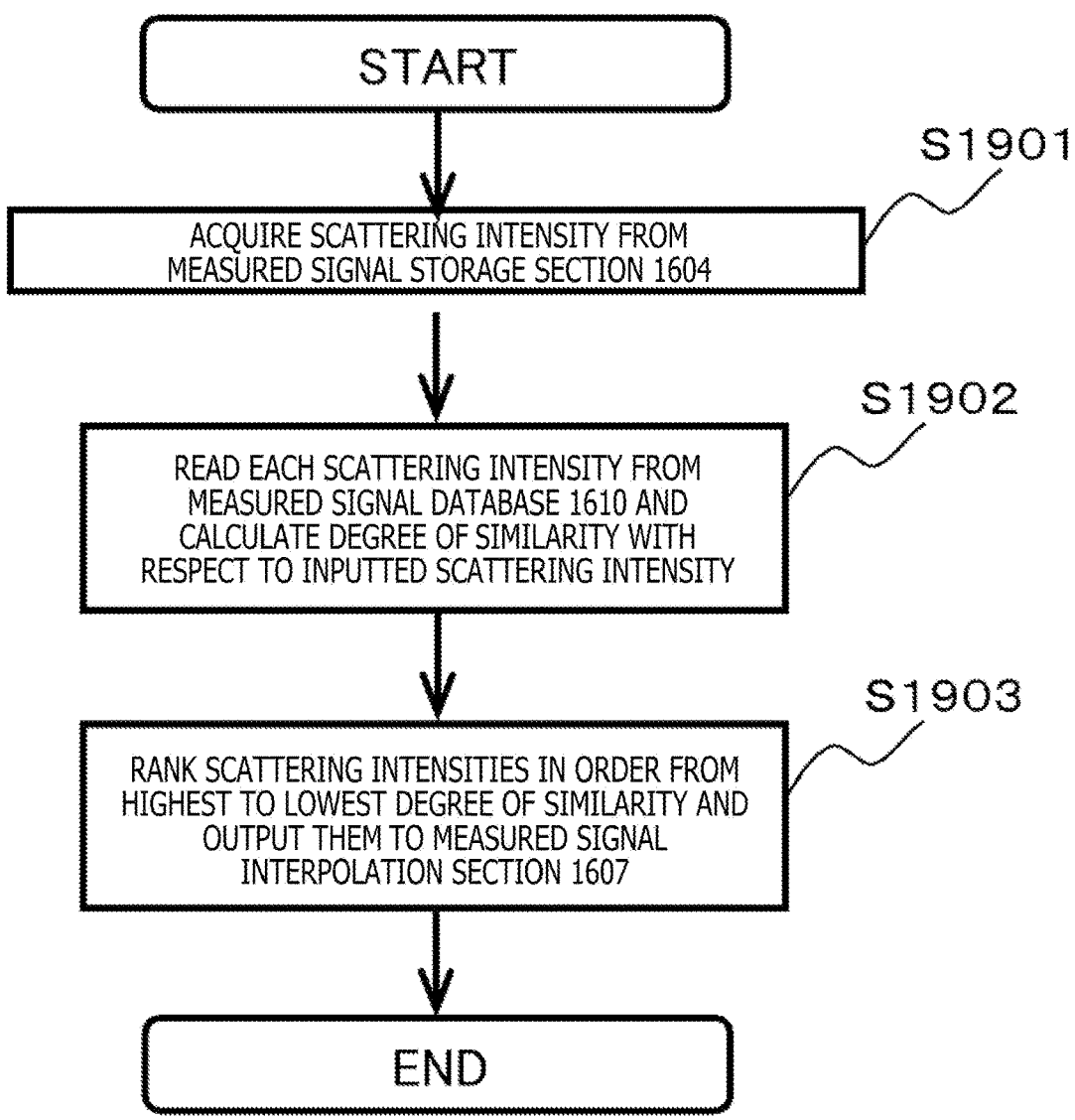

FIG. 23
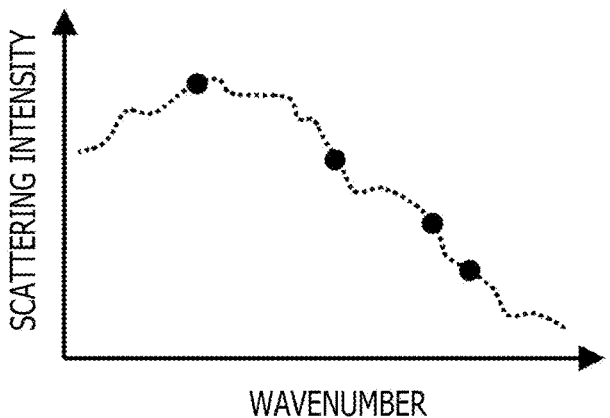
FIG. 24
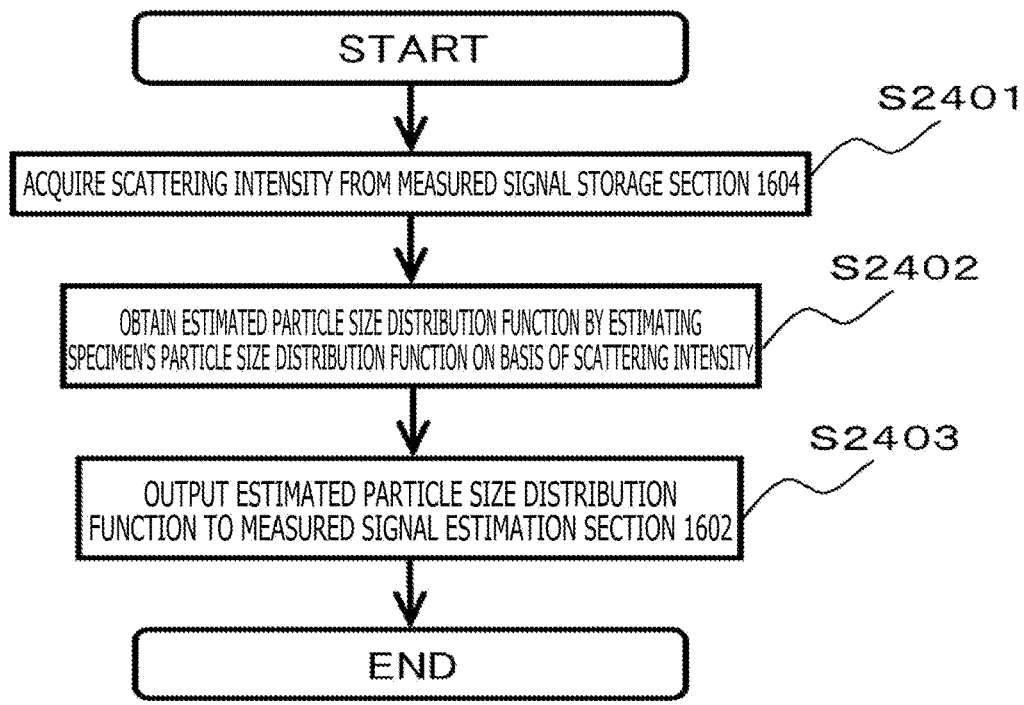
FIG. 25
| RADIUS [nm] 2501 | PARTICLE SIZE DISTRIBUTION FUNCTION [nm$^{-1}$] 2502 |
|---|---|
| 0.0 | 0.080 |
| 0.1 | 0.082 |
| 0.2 | 0.085 |
| ⋮ | ⋮ |

NEXT MEASUREMENT POINT CANDIDATE

WAVENUMBER [nm⁻¹]   0.1521

OK

MEASUREMENT GUIDE DEVICE AND SIMULATION COMPUTING DEVICE USED THEREFOR

TECHNICAL FIELD

The present invention relates to a measure guide device that proposes the next measurement target on the basis of the results of previous measurements.

BACKGROUND ART

In order to acquire accurate information about a target, performing measurements and surveys multiple times is widely performed. For example, if a national census or a socio-economic survey is made of only one person or one company, merely fragmentary information is obtained because such a survey needs to cover a wide range of targets. Therefore, it is necessary to collect information by performing sampling on a larger scale. The same is true for agricultural land surveys, fishing ground surveys, traffic surveys, and building inspection surveys. Further, in the field of materials research and development, too, a single specimen is measured multiple times during materials testing in order to achieve increased accuracy in the measurement of materials properties. However, the amount of work to be performed by survey personnel and experiment personnel increases with an increase in the time required for surveys and experiments. As a result, the required time and cost will increase. This creates a demand for a support system for reducing the burden and cost of surveys and experiments.

Disclosed, for example, in Patent Document 1 is an X-ray analysis operation guide system that obtains virtual measurement results by performing a measurement simulation under a plurality of different measurement conditions, and displays the result of comparison. On the basis of the displayed result of comparison, experiment personnel are able to adopt appropriate measurement conditions and start making measurements.

Further, disclosed in Patent Document 2 is an area survey support system that gives survey personnel instructions regarding a recommended route for area surveying on the basis of a prepared image database. This enables the survey personnel to go around an appropriate survey area according to the instructions from the area survey support system.

PRIOR ART DOCUMENT

Patent Documents

Patent Document 1: JP-2017-32521-A
Patent Document 2: JP-2013-33346-A

SUMMARY OF THE INVENTION

Problems to be Solved by the Invention

In a case where measurements are to be made multiple times, it is desirable that the next measurement point is selected according to a judgement made based on the results of previous measurements, for the purpose of maximizing the amount of acquired information. Survey personnel and experiment personnel may make such a selection on the basis of experiences. However, it is difficult for persons other than experts to adjust measurements by using the above method. Further, efficient measurement procedures vary depending on the type of analysis target, for example, the type of material to be developed. Therefore, an unprecedented new target cannot be handled. Furthermore, in a case where the whole of a long measurement process is to be manually adjusted, it is entirely delayed as it requires a significant amount of time. In such a case, therefore, it is necessary to provide certain automation.

It is conceivable that measurement conditions may be optimized at the beginning of experiment by simulating experiment conditions in advance as described in Patent Document 1. However, since Patent Document 1 merely states that a simulation is conducted in advance, in a case where measurements are to be made multiple times while varying the measurement conditions during experiment, Patent Document 1 does not take into consideration a method, the method optimizing subsequent measurement conditions with previously obtained measurement results being reflected on the subsequent measurement conditions.

Additionally, it is also conceivable that image data on the whole survey target area may be acquired in advance, for example, from a satellite or an airplane in order to optimize a survey route on the basis of the acquired image data, as described in Patent Document 2. However, it is not always possible to acquire comprehensive preliminary real data on the survey target in advance.

The present invention has been made in view of the above circumstances. An object of the present invention is to provide a measurement guide device and a simulation computing device used therefor. The measurement guide device is usable even by persons other than measurement experts, and able to select the next measurement target according to previously obtained measurement results without having to use real data on an analysis target in advance.

Means for Solving the Problems

In view of the above background arts and problems, the present invention provides, for example, a measurement guide device that proposes the next measurement point on the basis of obtained measurement results. The measurement guide device includes a database, a similarity search section, and a next-point proposal section. The database stores a virtual measured signal and a measurement procedure that are obtained by simulation. The similarity search section extracts, from the database, virtual measured signals similar to measurement results obtained by a measurement device, and measurement procedures regarding the virtual measured signals. The next-point proposal section selects one or more measurement procedures from the measurement procedures obtained by the similarity search section, and determines the next measurement point.

Advantages of the Invention

The present invention provides a measurement guide device and a simulation computing device used therefor. The measurement guide device is usable even by persons other than measurement experts, and able to select the next measurement target on the basis of previously obtained measurement results.

BRIEF DESCRIPTION OF THE DRAWINGS

FIG. 2 is a flowchart illustrating a process performed by the simulation computing device in the first embodiment.

FIG. 3 illustrates an example of a simulation condition reception screen in the first embodiment.

FIG. 6 illustrates an example of a data structure of a measurement procedure database in the first embodiment.

FIG. 8 illustrates an example of a display screen of a display section in the first embodiment.

FIG. 9 illustrates an example of a data structure of a measured signal in the first embodiment.

FIG. 10 is a flowchart illustrating a process performed by a similarity search section in the first embodiment.

FIG. 13 illustrates an example of a display screen of the display section in the first embodiment.

FIG. 14 illustrates an example of a display screen of the display section in the first embodiment.

FIG. 19 illustrates an example of a display screen of a measured signal input section in the second embodiment.

FIG. 20 is a flowchart illustrating a process performed by the similarity search section in the second embodiment.

FIG. 23 is a diagram illustrating an interpolation process performed by the measured signal interpolation section in the second embodiment.

FIG. 24 is a flowchart illustrating a process performed by a measurement target state estimation section in the second embodiment.

FIG. 25 illustrates an example of a data structure of an output from the measurement target state estimation section in the second embodiment.

MODES FOR CARRYING OUT THE INVENTION

Embodiments of the present invention will now be described in detail with reference to the accompanying drawings.

First Embodiment

Figure 1:
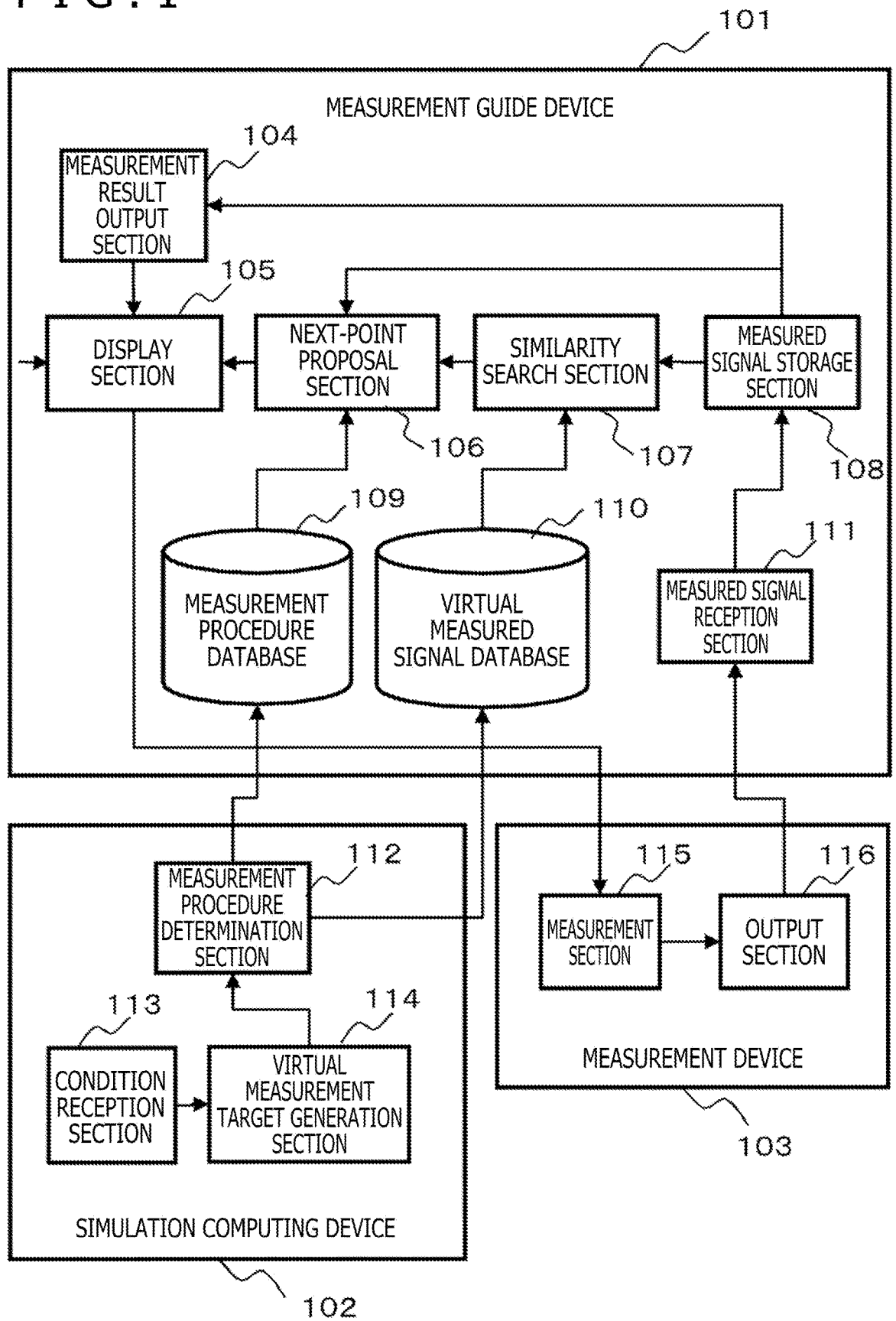
FIG. 1 is a block diagram illustrating functional configurations of a measurement guide device, a simulation computing device, and a measurement device that are included in a first embodiment of the present invention.

FIG. 1 is a block diagram illustrating an example of functional configurations of a measurement guide device, a simulation computing device, and a measurement device that are included in a first embodiment of the present invention.

Referring to FIG. 1, the measurement guide device 101 includes a measured signal reception section 111, a measured signal storage section 108, a virtual measured signal database 110, a measurement procedure database 109, a similarity search section 107, a next-point proposal section 106, a display section 105, and a measurement result output section 104. The measured signal reception section 111 receives measured signals from the measurement device 103. The measured signal storage section 108 accumulates measured signals. The virtual measured signal database 110 is used to store virtual measured signals generated by simulation. The measurement procedure database 109 is used to store measurement procedures obtained by simulation. The similarity search section 107 searches for virtual measured signals similar to measured signals. The next-point proposal section 106 proposes the next measurement point on the basis of measured signals and similar virtual measured signals. The display section 105 displays the proposed next measurement point to a user, prompts the user to determine whether or not to continue with measurement, and outputs measurement conditions to the measurement device. The measurement result output section 104 outputs a measurement result.

It should be noted that the measurement guide device 101 is implemented by hardware including general information processing devices, namely, a processor, a memory, a storage device, and a communication section (interface). More specifically, the measured signal reception section 111 acquires measured signals by using the communication section. The measured signal storage section 108 stores measured signals in the memory. The virtual measured signal database 110 and the measurement procedure database 109 store data in the storage device. Further, the similarity search section 107, the next-point proposal section 106, and the measurement result output section 104 are executed by the processor, which executes software processing by executing a program stored in the memory. Furthermore, the display section 105 functions as generally used operating and display sections, and includes, for example, a display, a keyboard, and a mouse or includes a display having a touch panel.

Moreover, the simulation computing device 102 generates data to be stored in the virtual measured signal database 110 and the measurement procedure database 109. The simulation computing device 102 includes a condition reception section 113, a virtual measurement target generation section 114, and a measurement procedure determination section 112. The condition reception section 113 allows the user to input simulation conditions. The virtual measurement target generation section 114 generates a virtual measurement target by performing a simulation. The measurement procedure determination section 112 determines a desirable measurement procedure for the generated virtual measurement target. It should be noted that the simulation computing device 102 is similarly implemented by hardware including general information processing devices, namely, a processor and a memory, and is executed by software processing.

Additionally, the measurement device 103 includes a measurement section 115 and an output section 116. The measurement section 115 makes measurements. The output section 116 outputs measurement results to the measurement guide device 101.

The present embodiment will now be described with reference to an example in which neutron scattering experiments are performed. A metal or other specimen is irradiated with a neutron beam, and then the resulting scattered neutrons are detected by a detector to acquire information about a microstructure within the specimen (e.g., the particle size distribution function of scatterers). Scattering intensity of detected neutrons corresponds to the above-mentioned measured signals. When a single measurement is made, the value of scattering intensity with respect to the value of a certain wavenumber of a scattered neutron beam is obtained. The present embodiment will be described with reference to a case where the particle size distribution function of a specimen is estimated by performing experiments to obtain the scattering intensity of neutrons.

FIG. 2 is a flowchart illustrating a process performed by the simulation computing device 102 in the present embodiment. Referring to FIG. 2, in step S201, the condition reception section 113 acquires, from the user, simulation execution conditions such as the allowable range of setting parameters.

FIG. 3 illustrates an example of a user input reception screen. As depicted in FIG. 3, the user inputs various simulation execution conditions by using, for example, a keyboard, and then selects the OK button to apply the inputted simulation execution conditions. Alternatively, the user may select the Cancel button to correct the inputted data.

Returning to FIG. 2, in step S202, the virtual measurement target generation section 114 probabilistically generates the particle size distribution function of virtual specimens. In this instance, the generation target is randomly selectable.

Figures 4, 5:
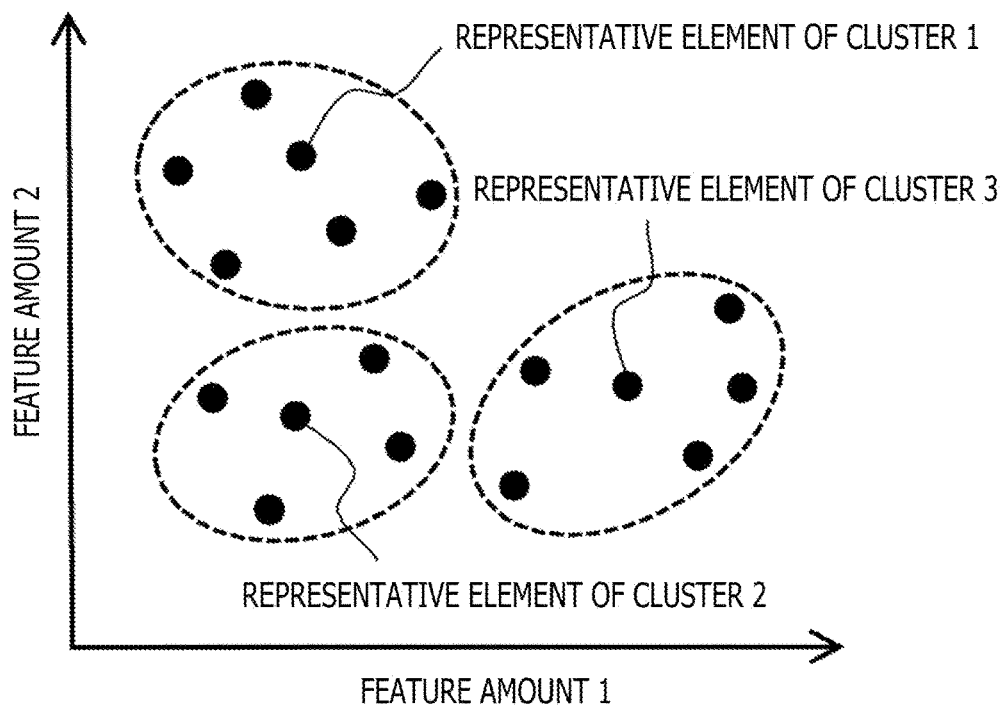
FIG. 4 is a diagram illustrating how a virtual measurement target generation section of the simulation computing device in the first embodiment selects a virtual measurement target by using a clustering method.
FIG. 5 illustrates an example of a data structure of a virtual measured signal database in the first embodiment.

FIG. 4 is a diagram illustrating how the virtual measurement target generation section selects a virtual measurement target by using a clustering method. As depicted in FIG. 4, the clustering method may be applied to a set of randomly generated specimens such that the difference between the specimens is enlarged and select a representative specimen from each cluster.

In step S203, the measurement procedure determination section 112 acquires the particle size distribution functions of the virtual specimens from the virtual measurement target generation section 114, and determines a measurement procedure for each of acquired particle size distribution functions, according to a predetermined algorithm. For example, a plurality of candidate wavenumbers q to be subsequently measured are generated randomly or on the basis of a predetermined standard on the presumption that one measurement of a certain wavenumber q is completed. The generated candidate wavenumbers q are then tabulated. Next, the scattering intensity I(q) at each tabulated point is calculated from the particle size distribution function p(r), according to equation (1) below.

$$I(q) = C \int_0^\infty dr \, p(r) \left( \frac{\sin qr - qr \cos qr}{q^3} \right)^2 \quad (1)$$

where C in equation (1) is a known constant coefficient.

Subsequently, the newly obtained scattering intensity value is added to a previously measured scattering intensity value, and then the whole of the obtained results is utilized to estimate p(r) by a nonlinear regression method (e.g., a well-known indirect Fourier transform method). The error between the estimated particle size distribution function and a true particle size distribution function generated by simulation is quantified to determine q that minimizes the quantified amount of error. The determined q can then be selected as the next measurement point. A certain other standard may be used to select q. For example, in a case where the amount of time required for measurement is given to each q, q may be selected on the basis of an amount that is obtained by weighting time and error for combination purposes. Stated differently, the measurement procedure is determined according to a standard for minimizing the number of measurements or the amount of measurement time required for achieving predetermined measurement accuracy or to a standard for minimizing the weighted sum of these two values.

In step S204, the scattering intensity of each virtual specimen is outputted to the virtual measured signal database 110, and then the measurement procedure for each virtual specimen is outputted to the measurement procedure database 109.

FIG. 5 illustrates the format of data outputted to the virtual measured signal database 110. As depicted in FIG. 5, the data includes information about a virtual measurement target ID 501, a wavenumber 502, and a scattering intensity 503.

FIG. 6 illustrates the structure of data outputted to the measurement procedure database 109. As depicted in FIG. 6, the data includes a virtual measurement target ID 601 and information 602 about wavenumbers listed in the order of scattering intensity measurement.

Figure 7:
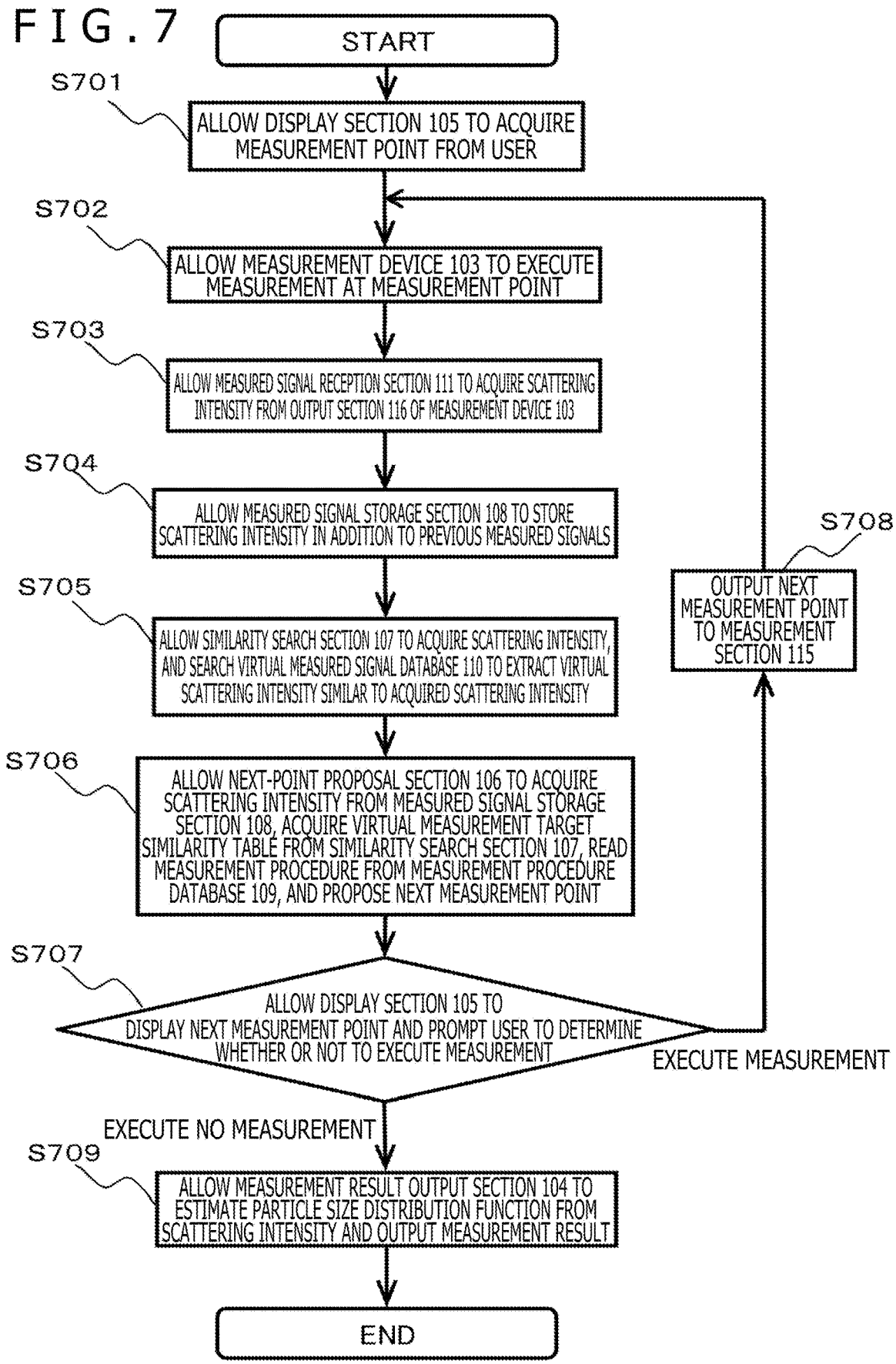
FIG. 7 is a flowchart illustrating a process performed by the measurement guide device in the first embodiment.

FIG. 7 is a flowchart illustrating a process performed by the measurement guide device 101 in the present embodiment. Referring to FIG. 7, first of all, in step S701, the display section 105 prompts the user to input a measurement point at the beginning of measurement.

FIG. 8 illustrates an example of a display screen of the display section 105. Referring to FIG. 8, for example, the user inputs a wavenumber measurement point by using, for example, a keyboard, then selects the "Yes" button to apply the inputted measurement point. Alternatively, the user may select the "No" button to correct the inputted data or stop execution.

In step S702, the measurement device 103 acquires a scattering intensity by performing a neutron scattering experiment based on the measurement point inputted from the display section 105. Subsequently, in step S703, the measured signal reception section 111 acquires information about scattering intensity from the output section 116 of the measurement device 103.

FIG. 9 illustrates an example of a data structure of a measured signal. As depicted in FIG. 9, the data structure acquired in this instance includes information 901 about a measured wavenumber and information 902 about scattering intensity.

In step S704, the measured signal storage section 108 stores new scattering intensity information in addition to previous scattering intensity information. The structure of the data stored in this instance is similar to the data structure depicted in FIG. 9 and is configured to store a plurality of pieces of data.

FIG. 10 is a flowchart illustrating a process that is performed in step S705 by the similarity search section 107. Referring to FIG. 10, first of all, in step S1101, the similarity search section 107 acquires information about a total scattering intensity from the measured signal storage section 108. In step S1102, the similarity search section 107 searches the virtual measured signal database 110 for information about scattering intensities similar to the acquired information about the total scattering intensity. In step S1103, the similarity search section 107 outputs the result of the search to the next-point proposal section 106 as a virtual measurement target similarity table. In a case where the similar scattering intensities are to be searched for, a method of defining with use of the reciprocal of Euclidean distance may be used as a similarity standard as indicated, for example, in equation (2) below. Alternatively, generalized or modified degree of similarity may be adopted as indicated below in equation (3), into which a positive weight w and a positive constant p are introduced.

$$\text{Degree of similarity} = \left(\sum_{k=1}^{N} |I_n(q_k) - I(q_k)|^2\right)^{-\frac{1}{2}} \quad (2)$$

$$\text{Degree of similarity} = \left(\sum_{k=1}^{N} \frac{|I_n(q_k) - I(q_k)|^p}{w(q_k)}\right)^{-1} \quad (3)$$

Using the above definition of degree of similarity makes it possible to calculate the degree of similarity to each scattering intensity stored in the virtual measured signal database 110 and rank the calculated degrees of similarity in order from the highest to the lowest.

Figures 11, 12:
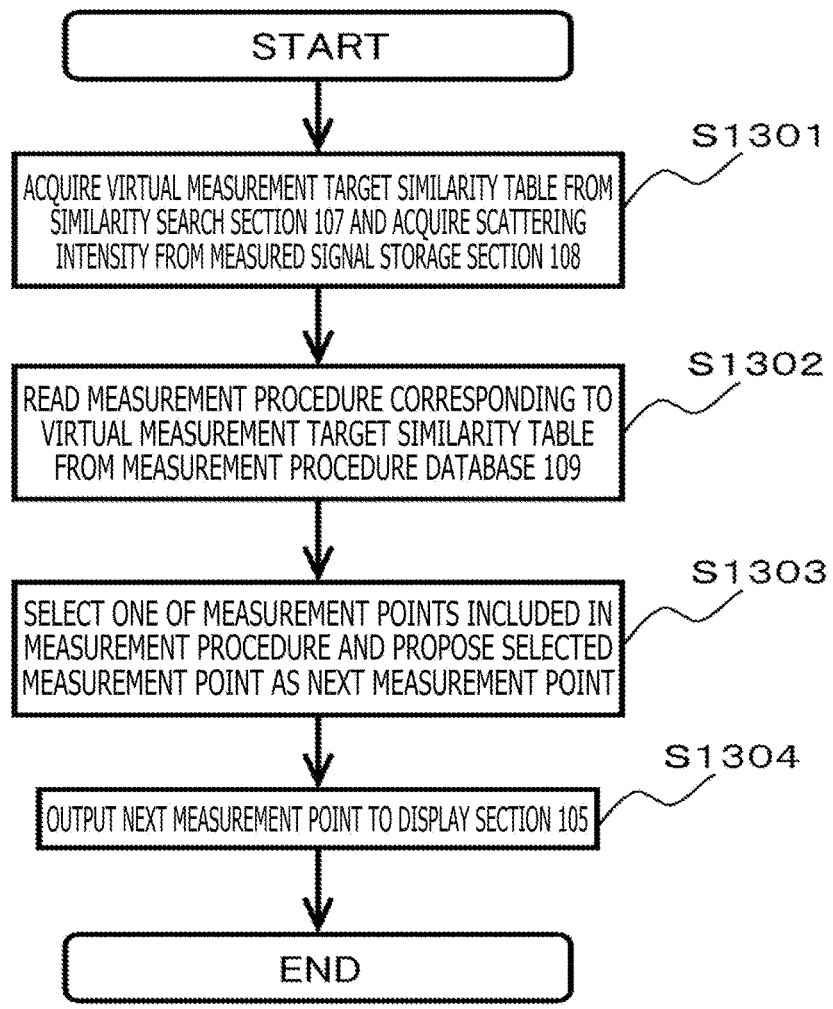
FIG. 11 illustrates an example data structure of an output from the similarity search section in the first embodiment.
FIG. 12 is a flowchart illustrating a process performed by a next-point proposal section in the first embodiment.

FIG. 11 illustrates an example of a data structure of an output from the similarity search section 107. As depicted in FIG. 11, the data outputted from the similarity search section 107 includes information about a degree-of-similarity ranking 1201, the degree of similarity 1202, and a virtual measurement target ID 1203.

FIG. 12 is a flowchart illustrating a process that is performed in step S706 by the next-point proposal section 106. In FIG. 12, first of all, in step S1301, the next-point proposal section 106 acquires a total scattering intensity from the measured signal storage section 108, and acquires the virtual measurement target similarity table from the similarity search section 107. Next, in step S1302, the next-point proposal section 106 reads, from the measurement procedure database 109, a measurement procedure linked to a virtual measurement target ID having a high degree-of-similarity ranking in the virtual measurement target similarity table. In step S1303, the next-point proposal section 106 selects one of the measurement points q included in the measurement procedure. Then, in step S1304, the next-point proposal section 106 outputs the selected measurement point to the display section 105 as the next measurement point. When the database is read on the basis of the degree of similarity as described above, it is expected that a semi-optimal measurement procedure for a current measurement target will be configured by referencing an efficient measurement procedure for an example having relatively high degree-of-similarity even if no examples existing in the database precisely match the current measurement target.

It should be noted that, when q is to be selected, an alternative is to probabilistically select one measurement procedure, for example, from a plurality of measurement procedures, and select a wavenumber that is included in the selected measurement procedure and is not yet included in the total scattering intensity (not yet measured). Another alternative is to avoid selecting q that is not equal to but is close to already measured q. Still another alternative is to output a plurality of values q when outputting the next measurement point to the display section 105.

In step S707, the display section 105 displays, to the user, the next measurement point acquired from the next-point proposal section 106, and prompts the user to determine whether or not to execute measurement at the displayed measurement point. As mentioned earlier, FIG. 8 illustrates an example of a display screen that is displayed to the user by the display section 105. Although FIG. 8 indicates that only one point is proposed as the next measurement point, an alternative is to display a plurality of candidate points and prompt the user to select the next measurement point from the displayed candidate points as depicted in FIG. 13. Another alternative is to propose a plurality of measurement points and prompt the user to determine whether or not to execute measurements at all the proposed measurement points as depicted in FIG. 14. In a case where the user selects execution of measurement from the display screen, a command for making measurements at a designated measurement point is transmitted in step S708 to the measurement section 115 of the measurement device 103. Meanwhile, in a case where the user does not select execution of measurement, the measurement terminates in step S709, so that the measurement result output section 104 performs a termination process.

Figure 15:
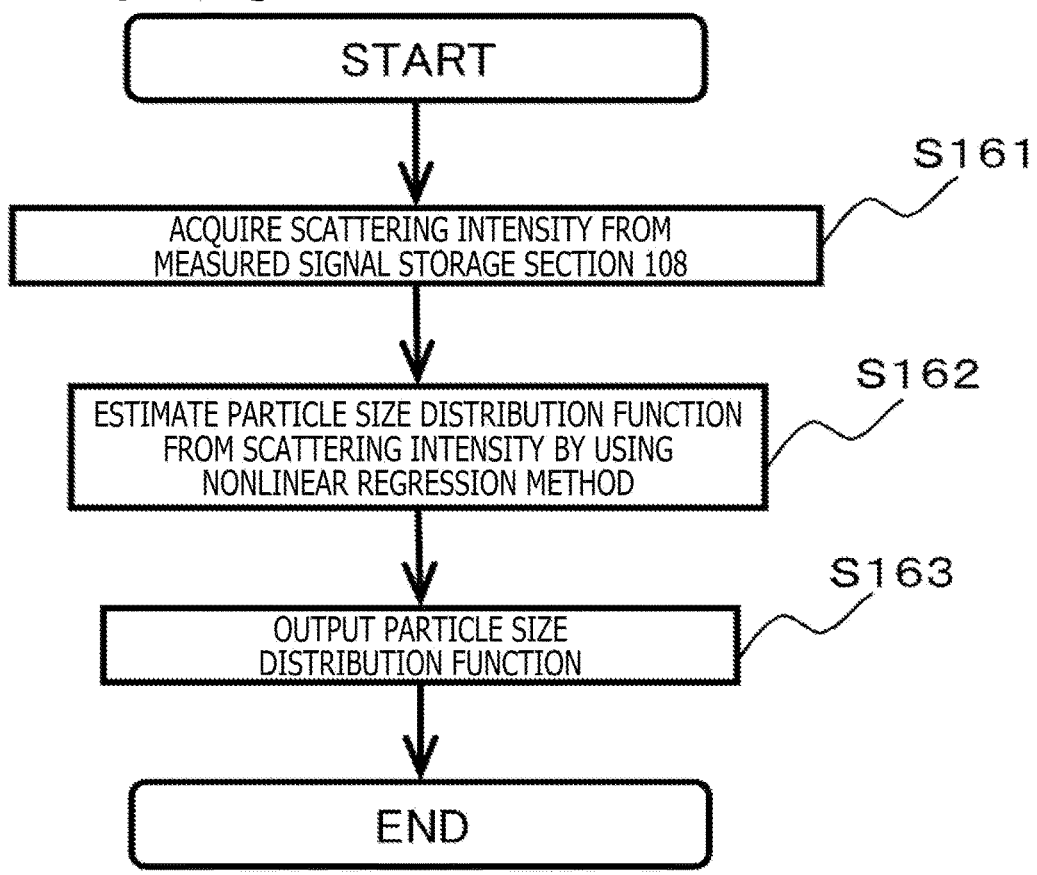
FIG. 15 is a flowchart illustrating a process performed by a measurement result output section in the first embodiment.

FIG. 15 is a flowchart summarizing a process performed in the measurement result output section 104. Referring to FIG. 15, in step S161, the measurement result output section 104 acquires a scattering intensity from the measured signal storage section 108. In step S162, on the basis of the scattering intensity, the measurement result output section 104 estimates the particle size distribution function by using a general nonlinear regression method such as the well-known indirect Fourier transform method. In step S163, the measurement result output section 104 outputs the estimated particle size distribution function to the display section 105, and then terminates the process.

Figure 16:
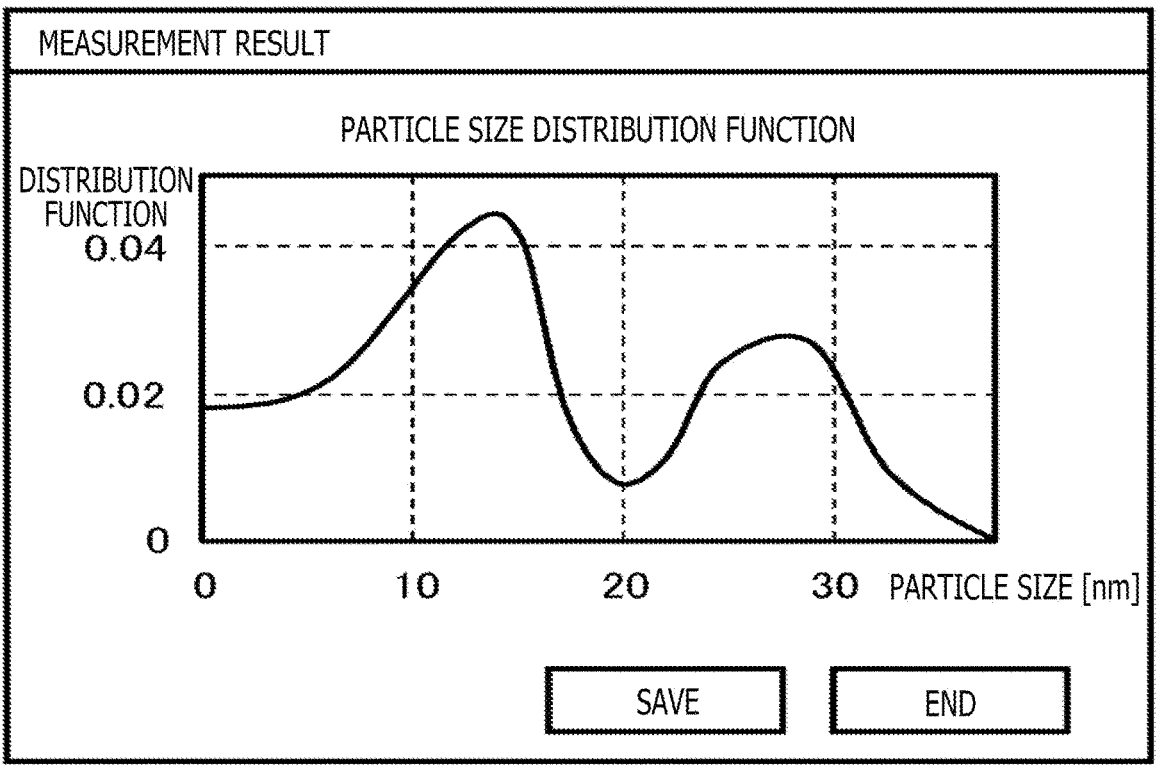
FIG. 16 illustrates an example of a display screen of the measurement result output section in the first embodiment.

FIG. 16 illustrates an example of a display screen that is displayed to the user by the display section 105 in order to display a measurement result outputted from the measurement result output section 104. Referring to FIG. 16, a distribution function with respect to a particle size is displayed, so that the measurement result can be stored by selecting the "Save" button. Further, the display can be terminated by selecting the "End" button.

It should be noted that the present embodiment is configured to directly output the next measurement point from the measurement guide device to the measurement device. Alternatively, however, the measurement guide device may propose the next measurement point to the user, and allow the user to manually input the next measurement point to the measurement device and make the next measurement.

Further, the present embodiment is configured such that the user designates the first measurement point and determines the second and subsequent measurement points according to a proposal made by the measurement guide device. However, the present invention is not limited to such a configuration. An alternative is to allow the user to designate a plurality of initial measurement points and allow the measurement guide device to determine the remaining measurement points.

Furthermore, the present embodiment is configured such that the user determines the end time point of measurement experiment. However, the present invention is not limited to such a configuration. Alternatively, the measurement guide device may automatically continue to issue instructions on measurement points to the measurement device until a termination condition designated in advance is satisfied, and automatically terminate the measurement at a time when the termination condition is satisfied. The termination condition is satisfied when, for example, the number of measurements reaches a predetermined threshold value. However, an alternative is to predefine a different termination condition.

As described above, even when no advance information about a measurement target is available, the present embodiment enables even a person other than a measurement expert to promptly select the next effective measurement point simply by inputting measured data. This makes it possible to conduct measurement experiments with improved efficiency. It should be noted that the present embodiment requires many simulations to be run as preliminary preparation. However, once the databases are established, no additional calculations need to be performed later. Therefore, the present embodiment provides remarkable advantages when measurement experiments are repeatedly conducted on many measurement targets.

Second Embodiment

It is assumed in the first embodiment that the measurement procedure for an intended measurement target is configured by preparing many measurement procedures in advance by simulation and reading the prepared measurement procedures during measurement. Meanwhile, a second embodiment of the present invention will now be described with reference to an example in which only a measured signal database is prepared without performing a measurement procedure simulation in advance.

The second embodiment is characterized in that it determines the next measurement point by predicting measured signals regarding unmeasured points each time new measured data is acquired and comparing the predicted measured signals with measured signals analogically inferred from measured signals stored in a database.

It should be noted that, as is the case with the first embodiment, the second embodiment will be described with reference to a case where the particle size distribution function of scatterers of a specimen is estimated from information about the scattering intensity of neutrons, which is obtained by performing neutron scattering experiments. Therefore, the scattering intensity of detected neutrons corresponds to the measured signals, and a quantity characterizing each measurement point is the wavenumber of a neutron beam.

Figure 17:
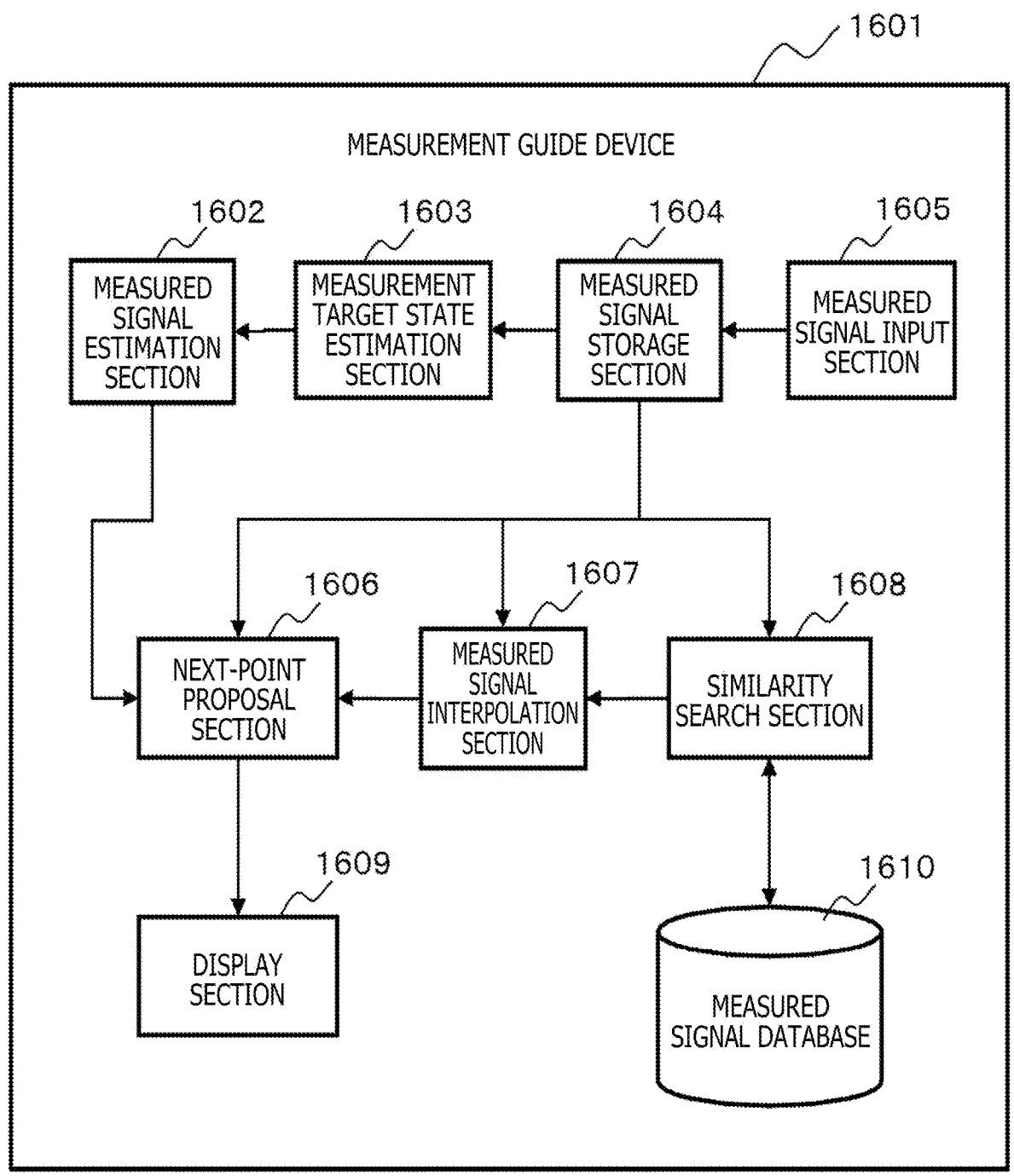
FIG. 17 is a block diagram illustrating a functional configuration of the measurement guide device in a second embodiment of the present invention.

FIG. 17 is a block diagram illustrating a functional configuration of the measurement guide device in the second embodiment. Referring to FIG. 17, the measurement guide device 1601 includes a measured signal input section 1605, a measured signal storage section 1604, a measurement target state estimation section 1603, a measured signal estimation section 1602, a similarity search section 1608, a measured signal interpolation section 1607, a next-point proposal section 1606, a display section 1609, and a measured signal database 1610. It should be noted that the measurement guide device 1601 is implemented by hardware including general information processing devices, as is the case with the measurement guide device in the first embodiment. Further, the measured signal input section 1605 is a generally used operating section including, for example, a keyboard and a mouse or including a display having a touch panel. Furthermore, the display section 1609 includes a generally used display or a display having a touch panel and integral with the measured signal input section 1605.

Figure 18:
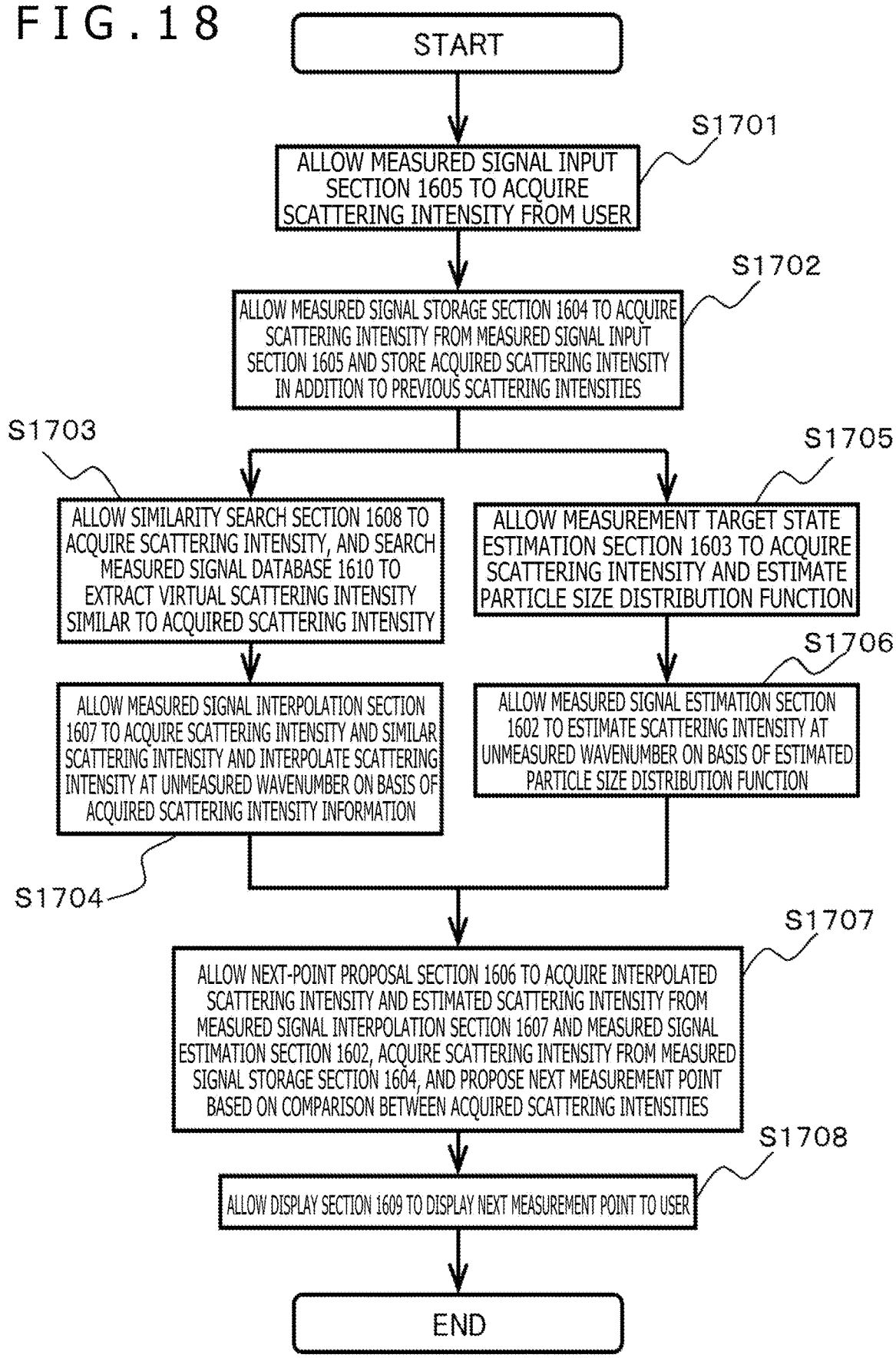
FIG. 18 is a flowchart illustrating a process performed by the measurement guide device in the second embodiment.

FIG. 18 is a flowchart illustrating a process performed by the measurement guide device 1601. Referring to FIG. 18, first of all, in step S1701, the measured signal input section 1605 acquires a scattering intensity from the user.

FIG. 19 illustrates an example of a display screen of the measured signal input section 1605. As depicted in FIG. 19, the user inputs the values of wavenumber and scattering intensity acquired by measurement, from the display screen. Data inputted by the user is applied when the OK button is selected. Further, the inputted data can be corrected by selecting the Cancel button. Moreover, the structure of the data acquired in this instance is similar to the data structure depicted in FIG. 9.

Next, in step S1702, the measured signal storage section 1604 acquires the scattering intensity from the measured signal input section 1605, and stores the acquired scattering intensity together with the total scattering intensity inputted thus far by the user. The structure of the data stored in this instance is similar to the data structure depicted in FIG. 9 and configured to store a plurality of pieces of data.

FIG. 20 is a flowchart illustrating a process that is performed in step S1703 by the similarity search section 1608. In step S1901 of FIG. 20, the similarity search section 1608 acquires a scattering intensity from the measured signal storage section 1604. In step S1902, the similarity search section 1608 searches the measured signal database 1610 for a scattering intensity similar to the above acquired scattering intensity, and calculates the degree of similarity with respect to an inputted scattering intensity. It should be noted that the data structure of the measured signal database 1610 is similar to the data structure depicted in FIG. 5, which is described earlier. In step S1903, the similarity search section 1608 ranks individual scattering intensities in order from the highest to the lowest degree-of-similarity, and outputs them to the measured signal interpolation section 1607.

Figure 21:
FIG. 21 illustrates an example of a data structure of an output from the similarity search section in the second embodiment.

FIG. 21 illustrates an example of a data structure of an output from the similarity search section. As depicted in FIG. 21, the data outputted from the similarity search section includes a degree-of-similarity ranking 2001, the degree of similarity 2002, a virtual measurement target ID 2003, a wavenumber 2004, and a scattering intensity 2005. For the calculation of the degree of similarity, the definition of degree of similarity indicated in equation (2) or (3) may be used, as is the case with the first embodiment. Alternatively, similarity definitions other those indicated in equations (2) and (3) may also be used. Further, calculation of degree of similarity may be performed after a scattering intensity is subjected to a predetermined linear or nonlinear transform.

Figure 22:
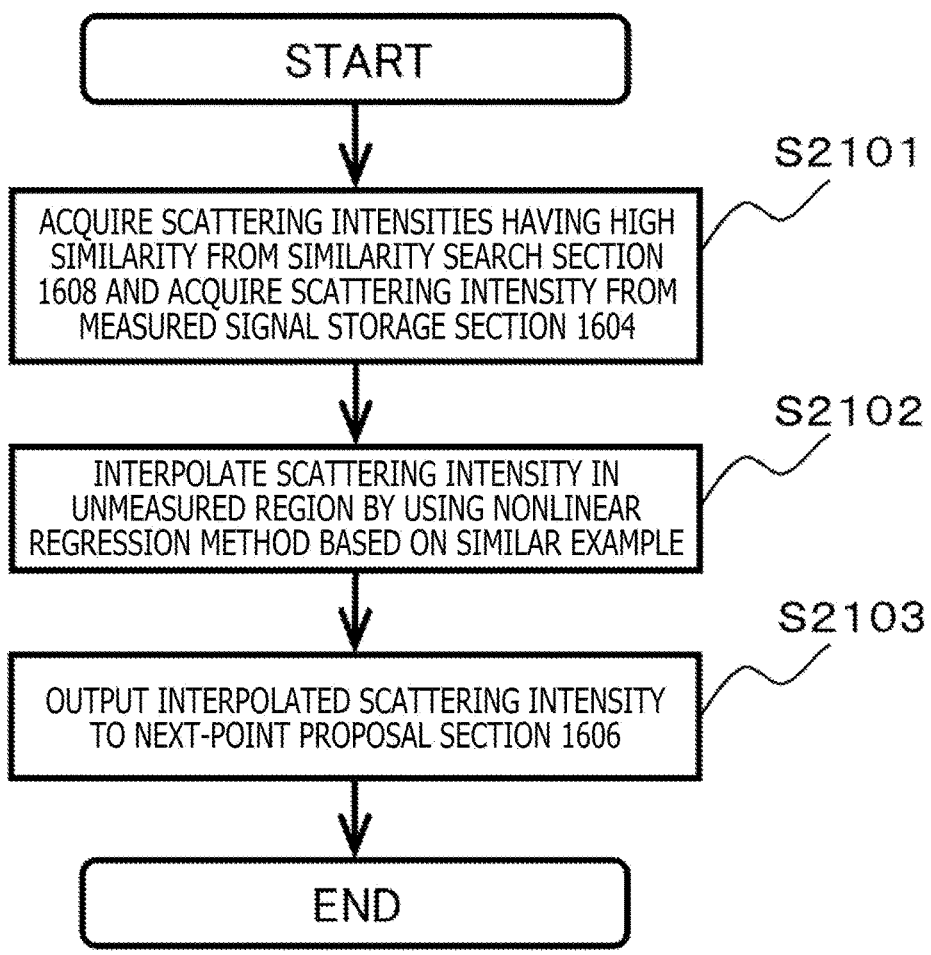
FIG. 22 is a flowchart illustrating a process performed by a measured signal interpolation section in the second embodiment.

FIG. 22 is a flowchart illustrating a process that is performed in step S1704 by the measured signal interpolation section 1607. Referring to FIG. 22, in step S2101, the measured signal interpolation section 1607 acquires information about similar scattering intensities from the similarity search section 1608, and acquires information about measured scattering intensities from the measured signal storage section 1604. In step S2102, on the basis of the information about the similar scattering intensities and the information about the measured scattering intensities, the measured signal interpolation section 1607 predicts a scattering intensity at an unmeasured wavenumber by using a nonlinear regression method including a K-nearest neighbor method or other machine learning method, and then interpolates the scattering intensity.

FIG. 23 is a diagram illustrating an interpolation process performed by the measured signal interpolation section 1607. Referring to FIG. 23, the black circled points indicate measured scattering intensities. An interpolation process is performed between such measured values as indicated by the dotted line.

In step S2103, the measured signal interpolation section 1607 outputs information about the interpolated scattering intensity to the next-point proposal section 1606. The structure of such output data is similar to the data structure depicted in FIG. 9 and configured to include a plurality of pieces of data.

FIG. 24 is a flowchart illustrating a process that is executed in step S1705 by the measurement target state estimation section 1603. Referring to FIG. 24, first of all, in step S2401, the measurement target state estimation section 1603 acquires data on a measured scattering intensity from the measured signal storage section 1604. The structure of the data acquired in this instance is similar to the data structure depicted in FIG. 9 and configured to include a plurality of pieces of data. Next, in step S2402, the measurement target state estimation section 1603 estimates the internal state of a specimen from the scattering intensity, that is, the particle size distribution function, by using, for example, the well-known indirect Fourier transform method. In step S2403, the measurement target state estimation section 1603 outputs the estimated value of the particle size distribution function to the measured signal estimation section 1602.

FIG. 25 illustrates an example of a data structure of an output from the measurement target state estimation section 1603. As depicted in FIG. 25, the data outputted from the measurement target state estimation section 1603 includes values indicating the radius 2501 of a scatterer and the particle size distribution function 2502.

Figure 26:
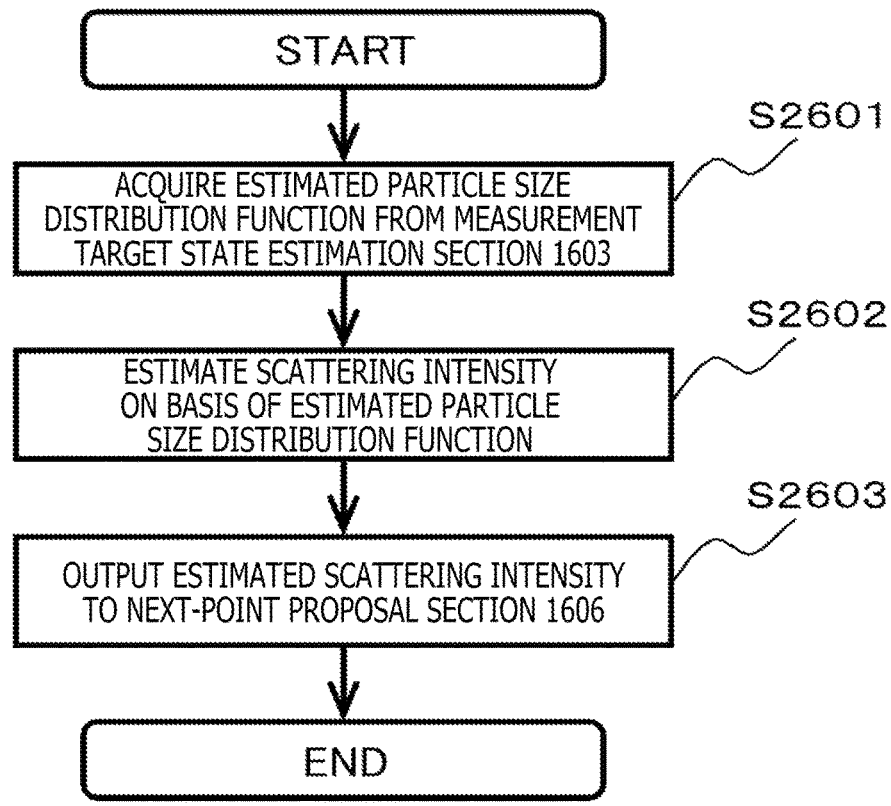
FIG. 26 is a flowchart illustrating a process performed by a measured signal estimation section in the second embodiment.

FIG. 26 is a flowchart illustrating a process that is performed in step S1706 by the measured signal estimation section 1602. In step S2601 of FIG. 26, the measured signal estimation section 1602 acquires an estimated value of the particle size distribution function from the measurement target state estimation section 1603. In step S2602, the measured signal estimation section 1602 calculates a scattering intensity from the particle size distribution function, according to equation (1). In step S2603, the measured signal estimation section 1602 outputs the calculated estimated scattering intensity to the next-point proposal section 1606. The structure of the data outputted in this instance is similar to the data structure depicted in FIG. 25.

Figure 27:
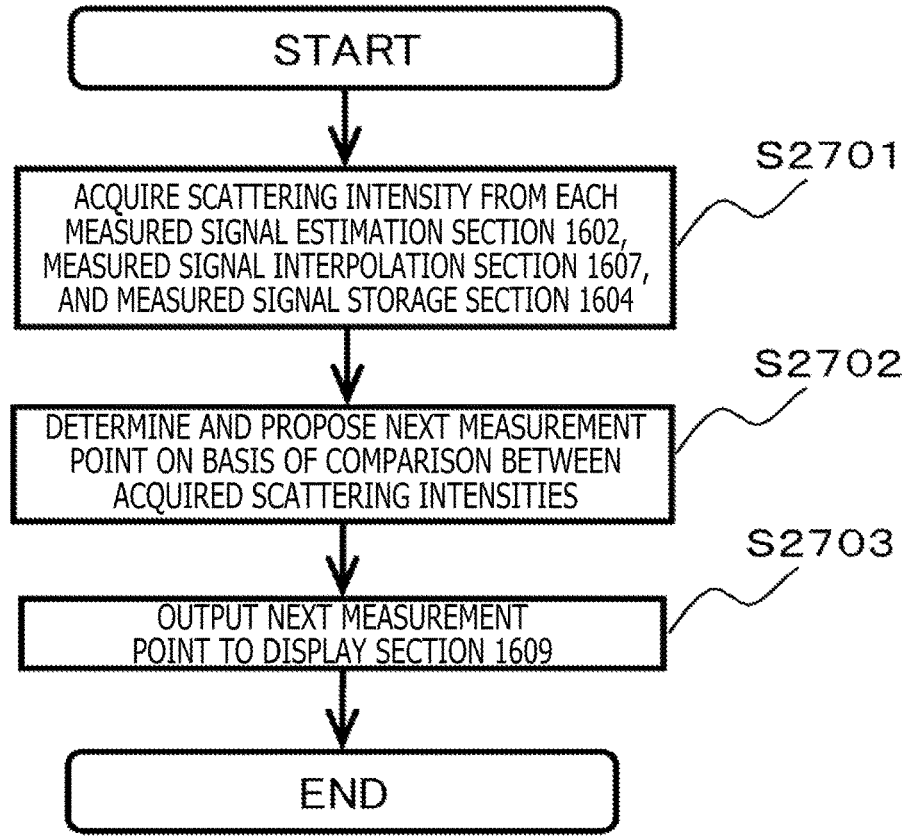
FIG. 27 is a flowchart illustrating a process performed by the next-point proposal section in the second embodiment.

FIG. 27 is a flowchart illustrating a process that is performed in step S1707 by the next-point proposal section 1606. Referring to FIG. 27, in step S2701, the measured signal estimation section 1602 acquires the information about the interpolated scattering intensity from the measured signal interpolation section 1607, acquires the information about the estimated scattering intensity from the measured signal estimation section 1602, and acquires the information about the measured scattering intensity from the measured signal storage section 1604. In step S2702, the measured signal estimation section 1602 selects the next measurement point on the basis of comparison between the interpolated scattering intensity and the estimated scattering intensity. In this process of comparison, it is possible, for example, to determine the difference between these two scattering intensities, locate a point where the absolute value of the difference is great, and select the located point as the next measurement point. An alternative is to perform a nonlinear transform on each of these two scattering intensities and then determine the difference between them. Another alternative is to select the next measurement point that is neither equivalent nor close to an already measured wavenumber. In step S2703, the measured signal estimation section 1602 outputs the value of the next measurement point to the display section 1609.

As described above, it is possible to compare scattering intensities predicted by two different methods, determine the difference between the scattering intensities, and identify the wavenumber at which the scattering intensity based on a currently estimated particle size distribution function has low reliability. This makes it possible to estimate a measurement point that is expected to be greatly effective in correcting the estimated particle size distribution function.

Figures 28, 29:
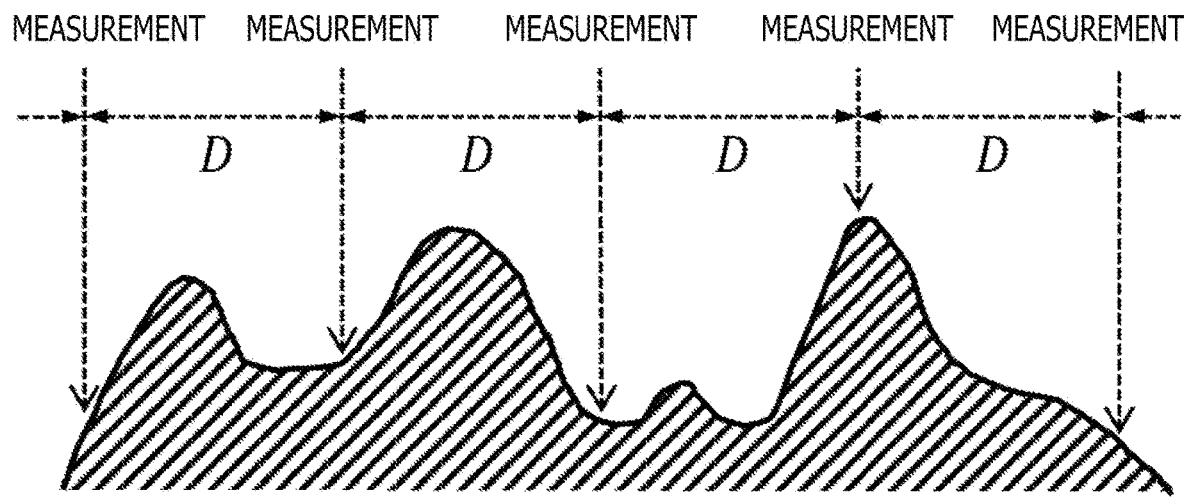
FIG. 28 illustrates an example of a screen that is displayed to a user by the display section in the second embodiment.
FIG. 29 is a diagram illustrating a measurement process in a third embodiment of the present invention.

In step S1708, the display section 1609 displays the next measurement point to the user. FIG. 28 illustrates an example of a screen that is displayed to the user by the display section 1609. Although FIG. 28 depicts a method of proposing one measurement point as the next measurement point, an alternative is to use a method of allowing the display section 1609 to propose to the user two or more predesignated measurement points as depicted in FIGS. 13 and 14. On the basis of the proposal made by the display section 1609, the user executes the next measurement, and re-inputs the obtained information about scattering intensity to the measured signal input section 1605 of the measurement guide device 1601. In the above-described manner, measurement experiments can be conducted by allowing the user to repeat steps S1701 to S1708 a desired number of times. However, the measurement points need not always be determined on the basis of the proposal made by the measurement guide device 1601 as described above. Instead, in the course of repeated measurements, measurements may be made at user-determined measurement points that are determined on the basis of an alternative method.

Further, the second embodiment is configured such that the user inputs information about a measurement result to the measurement guide device 1601 and then inputs the next measurement point, which is outputted from the measurement guide device 1601, to the measurement device. However, an alternative is to allow the measurement guide device 1601 to directly output the next measurement point to the measurement device as described in conjunction with the first embodiment.

Furthermore, an additional function may be incorporated such that the particle size distribution function estimated by the measurement target state estimation section 1603 is displayed to the user by the display section 1609 as depicted in FIG. 16.

Moreover, the data to be stored in the measured signal database 1610 may be data obtained from field surveys and actual measurement experiments, virtual data generated by simulation, or a combination of such data.

As described above, the second embodiment enables even a person other than a measurement expert to select the next effective measurement point in real time during measurement, and thus makes it possible to efficiently perform a measurement process. Additionally, in contrast to the first embodiment, the second embodiment eliminates the necessity of performing a measurement procedure simulation in advance, and merely requires the preparation of a measured signal database. This makes it possible to immediately start measurement.

Third Embodiment

The second embodiment has been described on the assumption that specimens are analyzed for the purpose of neutron scattering experiments. However, the methods described in conjunction with the second embodiment are also applicable to other applications. A third embodiment of the present invention will now be described with reference to an example in which the third embodiment is applied to object surface shape measurement.

FIG. 29 is a diagram illustrating a measurement process in the third embodiment. As depicted in FIG. 29, the measurement process is configured to repeatedly measure (scan), at regular intervals D, the surface of an object represented by hatched lines. This scanning may be performed by an electron microscope for observing the microstructure of a specimen surface, by an artificial satellite for measuring the topography of terrain, by a ship for exploring the shape of a seabed, or by any other measurement means. It should be noted that the quantity D characteristic of the measurement intervals may be either length or time. However, the following description assumes that the quantity D is length.

The smaller the value D, the more accurate the resulting information will be. However, increasing the number of measurements incurs disadvantages in terms, for example, of time and cost. Therefore, the value D should not be excessively small. In a case where one scan is made with the value D fixed, then a new scan is made with the value D changed, and this scanning operation is repeated a number of times as desired by measurement personnel in order to estimate the shape of an object surface with high accuracy, there remains a problem where it is necessary to determine how to select the value D for each scan. The second embodiment can be applied to solve such a problem. In neutron scattering experiments, the quantity characteristic of measurement points is a wavenumber. In object shape scanning, however, the measurement points are defined by the distance D between adjacent measurement points. Further, in neutron scattering experiments, a measured signal obtained from one measurement is a scattering intensity. In object shape scanning, however, a measured signal obtained from one scan is information about the height of each of measurement points spaced at regular intervals. Furthermore, in neutron scattering experiments, a measurement target state is represented by a particle size distribution function. In object shape scanning, however, the measurement target state is represented by an object shape. FIGS. 17 to 28 are applicable under the above-described conceptual correspondence.

While the present invention has been described in conjunction with the foregoing embodiments, the present invention is not limited to the foregoing embodiments, but extends to various modifications. For example, the foregoing embodiments have been described in detail in order to facilitate the understanding of the present invention. The present invention is not necessarily limited to a configuration that includes all the above-described component elements. Further, some component elements of an embodiment may be partly replaced by the component elements of another embodiment, and the component elements of an embodiment may be added to the component elements of another embodiment. Furthermore, some component elements of each embodiment may be subjected to the addition of other component elements, deleted, or replaced by other component elements.

DESCRIPTION OF REFERENCE NUMERALS

101: Measurement guide device
102: Simulation computing device
103: Measurement device
106: Next-point proposal section
107: Similarity search section
109: Measurement procedure database
110: Virtual measured signal database
1601: Measurement guide device
1602: Measured signal estimation section
1603: Measurement target state estimation section
1606: Next-point proposal section
1607: Measured signal interpolation section
1608: Similarity search section
1610: Measured signal database

The invention claimed is:

1. A measurement guide system for proposing a next measurement point on a basis of obtained measurement results, the measurement guide system comprising:
   a memory;
   at least one processor, coupled to said memory, and operative to perform operations comprising:
   irradiating, by a measurement device, a metal with a neutron beam and a detector configured to detect scattered neutrons;
   storing, by a first database, virtual measured signals and storing, by a second database, measurement procedures that are obtained by simulation;
   a first computer programmed to generate the virtual measured signals of virtual specimens to store in the first database by a simulation, and to generate measurement procedures for each virtual specimen to store in the second database; and
   a second computer coupled to the measurement device, first database, second database and first computer,
   wherein the measurement device executes irradiation of the metal with the neutron beam to generate a scattering intensity of detected neutrons as measurement results, which is stored in the second computer, the measurement results including a wavenumber and corresponding scattering intensity,
   wherein the second computer is programmed to:
   extract, from the first database, virtual measured signals similar to the measurement results obtained by the measurement device, and, from the second database, measurement procedures regarding the virtual measured signals, and
   select at least one measurement procedure from the measurement procedures obtained by the similarity search section, determining the next measurement point, and
   wherein the measurement device executes measurement of the metal at the determined next measurement point.

2. The measurement guide system according to claim 1, wherein the first computer is programmed to:
   receive a plurality of simulation conditions;
   generate a virtual measurement target by performing a according to the plurality of simulation conditions.

3. The measurement guide system according to claim 2, wherein the first computer is programmed to determine a measurement procedure, according to a standard for minimizing the number of measurements or the amount of measurement time required for achieving predetermined measurement accuracy or to a standard for minimizing weighted sum of the required number of measurements and the required amount of measurement time.

4. The measurement guide system according to claim 2, wherein the first computer is programmed to extract a virtual measurement target from many virtual measurement target candidates by using a clustering method.

5. A measurement guide system for proposing a next measurement point on a basis of obtained measurement results, the measurement guide system comprising:

a memory;

at least one processor, coupled to said memory; and operative to perform operations comprising:

irradiating, by a measurement device, a metal with a neutron beam and a detector configured to detect scattered neurons;

storing, by a database, measured signals measured by the measurement device; and a first computer coupled to the measurement device and the database, wherein the measurement device executes irradiation of the metal with the neutron beam to generate a scattering intensity of detected neutrons as measurement results, which is stored in the second computer, the measurement results including a wavenumber and corresponding scattering intensity, wherein the first computer programmed to:

extract, from the database, measured signals similar to measurement results obtained by the measurement device, estimating a measured signal regarding an unmeasured point on a basis of the measurement results obtained by the measurement device, and determining the next measurement point on a basis of difference between a measured signal obtained by the similarity search section and a measured signal obtained by the estimation section, wherein the measurement device executes measurement of the metal at the determined next measurement point.

* * * * *